United States Patent

Yano

Patent Number: 5,847,881
Date of Patent: *Dec. 8, 1998

[54] REAL IMAGE FINDER

[75] Inventor: Takaaki Yano, Hokkaido, Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 803,149

[22] Filed: Feb. 19, 1997

[30] Foreign Application Priority Data

Feb. 20, 1996 [JP] Japan .................................. 8-032524

[51] Int. Cl.$^6$ ........................................ G02B 15/14
[52] U.S. Cl. .......................... 359/676; 359/689; 359/431; 359/691; 359/355; 359/640
[58] Field of Search ..................... 359/835, 833, 359/640, 642, 676, 689, 691, 431, 355; 396/378, 379, 384

[56] References Cited

U.S. PATENT DOCUMENTS

| | | | |
|---|---|---|---|
| 5,136,427 | 8/1992 | Sugawara | 359/646 |
| 5,193,030 | 3/1993 | Nozaki et al. | 359/687 |
| 5,225,927 | 7/1993 | Nozaki et al. | 359/676 |
| 5,250,969 | 10/1993 | Abe et al. | |
| 5,337,109 | 8/1994 | Ogawa | |
| 5,408,553 | 4/1995 | English, Jr. et al. | 359/640 |
| 5,513,043 | 4/1996 | Abe et al. | 359/691 |
| 5,565,950 | 10/1996 | Taguchi et al. | 396/386 |
| 5,668,674 | 9/1997 | Kanai et al. | 359/640 |

*Primary Examiner*—Loha Ben
*Attorney, Agent, or Firm*—Greenblum & Bernstein, P.L.C.

[57] ABSTRACT

A real image finder includes an objective optical system which forms an image of an object to be viewed on a primary image forming surface, a viewing optical system which is adapted to view the object image formed on the primary image forming surface, and an image erection optical system having four reflection surfaces. The optical axis of the objective optical system is aligned parallel with the optical axis of an ocular optical system. Two of the four reflection surfaces of the image erection optical system are located before the primary image forming surface and the remaining two reflection surfaces are located after the primary image forming surface. The first two reflection surfaces are defined by mirrors and the latter two reflection surfaces are defined by a prism.

4 Claims, 4 Drawing Sheets

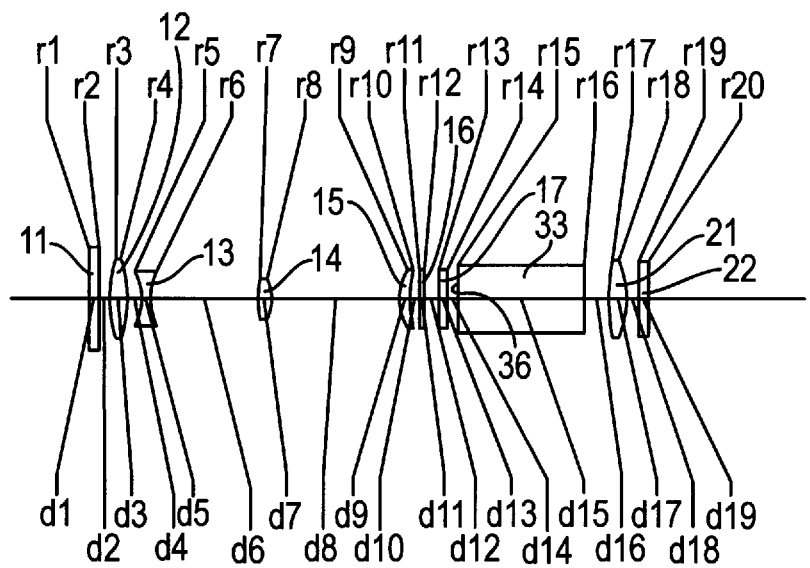
FIG. 3
FIG. 4A
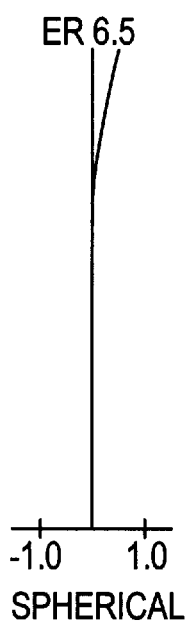
ER 6.5
-1.0   1.0
SPHERICAL
ABERRATION
CHROMATIC
ABERRATION
FIG. 4B
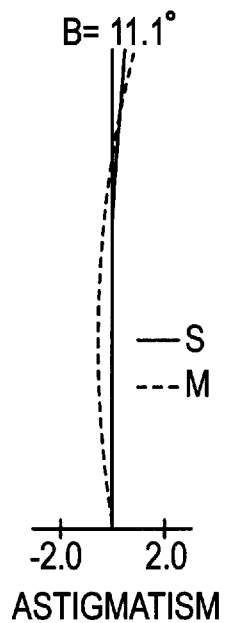
B= 11.1°
— S
--- M
-2.0   2.0
ASTIGMATISM
FIG. 4C
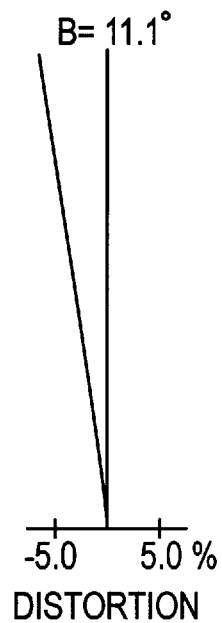
B= 11.1°
-5.0   5.0 %
DISTORTION Spherical Aberration Chromatic Aberration Astigmatism Distortion

REAL IMAGE FINDER

BACKGROUND OF THE INVENTION

1. Field of the Invention

The present invention relates to a real image finder which is adapted to view an erect image.

2. Description of the Related Art

Conventional real image finders, which are chiefly incorporated in compact cameras, include an objective optical system, an ocular optical system and an optical image erecting system. The objective optical system forms an object image at a primary image forming surface (plane), which is then viewed through the ocular optical system. The optical image erecting system is adapted to erect an inverted image formed by the objective optical system.

The image erecting system comprises of four reflection surfaces and is usually in the form of a Porro prism. In some viewfinders, instead of a Porro prism, four separate reflection surfaces are arranged before and after the primary image forming surface of the objective optical system to increase the distance between the optical axis of the objective optical system and the optical axis of the ocular optical system.

In such a real image finder, since the object image formed on the primary image forming surface of the objective optical system is viewed through the ocular optical system, the possibility exists that foreign matter, such as dust, attached to the primary image forming surface, is also viewed. To prevent this, devices have been proposed in which the area of the primary image forming surface is sealed to prevent foreign matter from attaching to the primary image forming surface. However, in a real image finder in which four separate reflection surfaces are positioned before and after the primary image forming surface of the image erecting system, foreign matter attached to the surface of the image erecting system located adjacent to the primary image forming surface, for example, a reflection surface of a mirror or an incident surface of a prism, can be viewed together with the object image. Moreover, a contradictory need exists for the miniaturization of a viewfinder to make a camera small and to increase of the magnification of the finder to improve viewing capability.

SUMMARY OF THE INVENTION

It is an object of the present invention to provide a small real image finder whose magnification is large and in which four reflection surfaces, that constitute an optical image erecting system, are provided before and after a primary image forming surface of an objective optical system, wherein foreign matter attached to the surface of the image erecting system is inconspicuous upon observation.

To achieve the object mentioned above, according to the present invention, there is provided a real image finder having an objective optical system which forms an image of an object to be viewed on a primary image forming surface. An ocular optical system is adapted to view the object image formed on the primary image forming surface. An image erection optical system is provided having four reflection surfaces before and after the primary image forming surface. The optical axis of the objective optical system is in parallel with the optical axis of the ocular optical system. Two of the four reflection surfaces of the image erection optical system are located before the primary image forming surface and the remaining two reflection surfaces of the image erection optical system are located after the primary image forming surface. The two reflection surfaces on the objective optical system side are defined by mirrors, and the two reflection surfaces on the ocular optical system side are defined by a prism. The finder satisfies the following relationships (1), (2) and (3):

$$|L_1 \div (f_e^2/1000)| > 10 \quad (1)$$

$$|L_2 \div (f_e^2/1000)| > 11 \quad (2)$$

$$L_3 \div f_e > 0.8 \quad (3)$$

wherein $L_1$ represents the distance, along the optical axis direction, between the primary image forming surface and the lowest reflecting point of rays on a first surface of the image erection optical system, as viewed from the primary image forming surface side towards the objective optical image side;

$L_2$ represents the distance, along the optical axis direction, between the primary image forming surface and a point on an incident surface of the image erection optical system, as viewed from the primary image forming surface side towards the ocular optical system side;

$f_e$ represents the focal length (mm) of the ocular optical system; and $L_3$ represents the distance (mm) between the optical axis of the objective optical system and the optical axis of the ocular optical system.

The present disclosure relates to subject matter contained in Japanese Patent Application No. 08-32524 (filed on Feb. 20, 1996) which is expressly incorporated herein by reference in its entirety.

BRIEF DESCRIPTION OF THE DRAWINGS

The invention will be described below in detail with reference to the accompanying drawings, in which:

FIG. 3 is a lens arrangement of a real image finder at a wide-angle extremity (small magnification) according to the present invention;

FIGS. 4A, 4B and 4C are aberration diagrams of the lens system shown in FIG. 3 at the wide-angle extremity; and, FIGS. 5A, 5B and 5C are aberration diagrams of the lens system shown in FIG. 3 at a telephoto extremity (large magnification).

DESCRIPTION OF THE PREFERRED EMBODIMENTS

Figure 1:
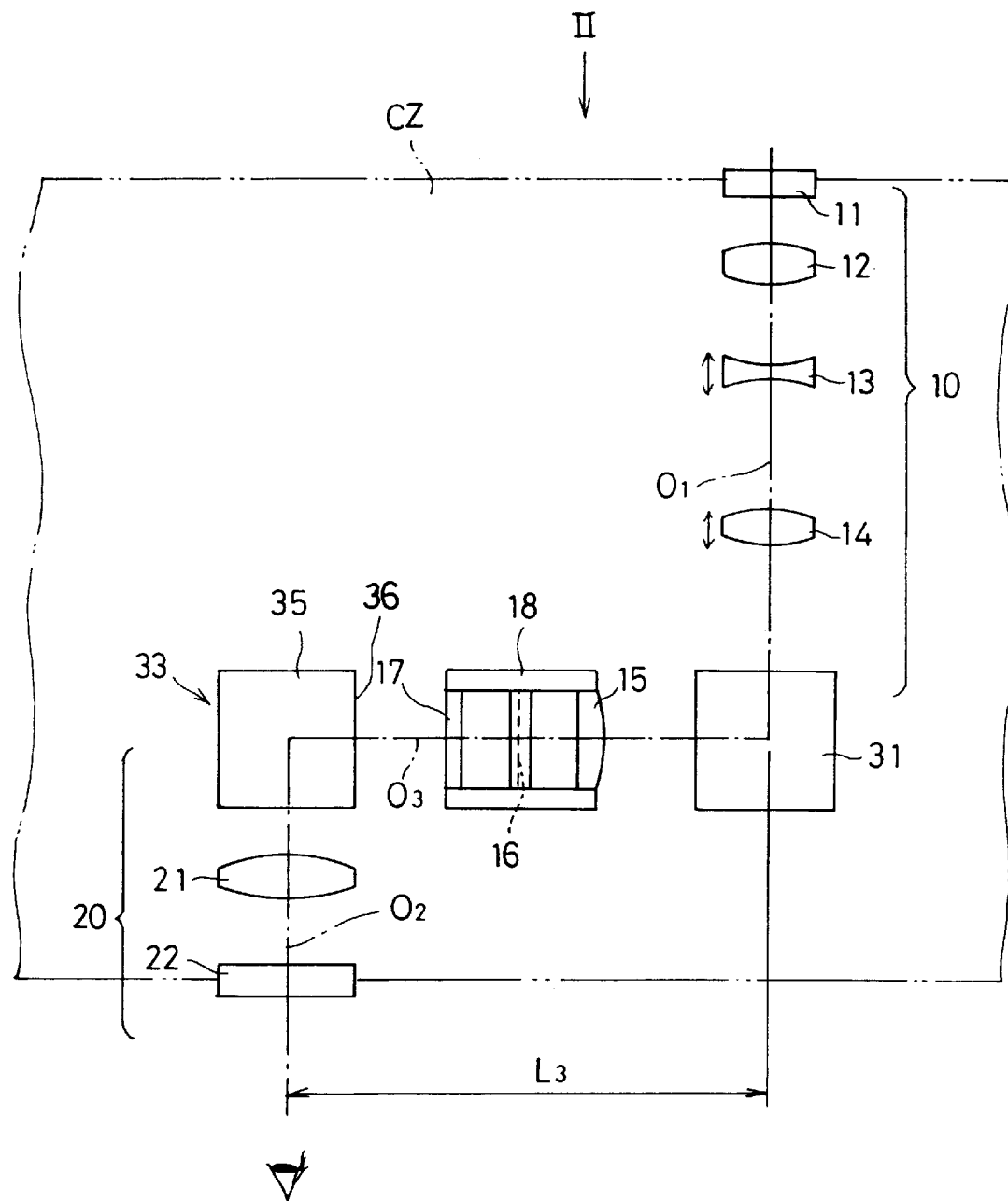
FIG. 1 is a plan view of a real image finder according to an embodiment of the present invention.
Figure 2:
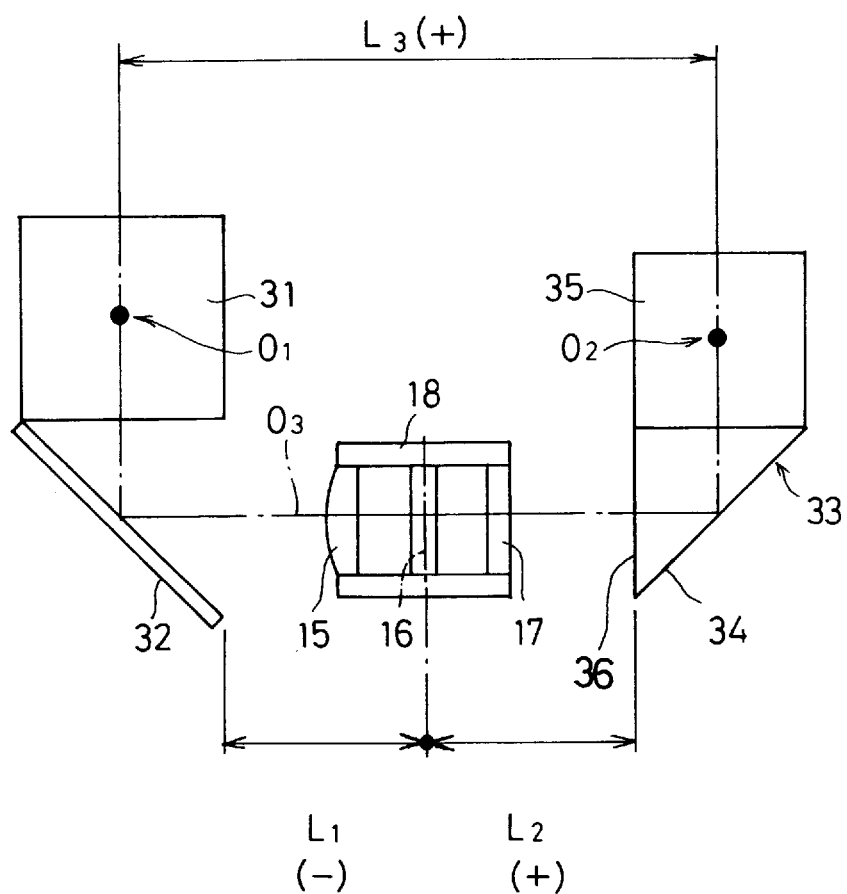
FIG. 2 is a front elevational view in the direction of an arrow II shown in FIG. 1.
Figure 5A:
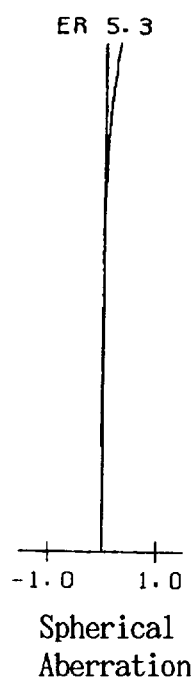
Figure 5B:
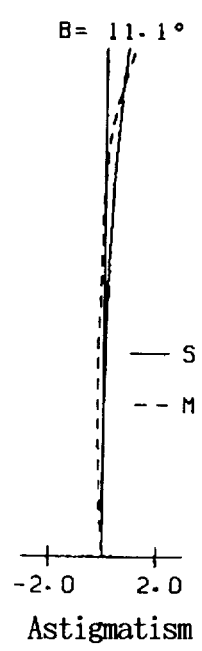
Figure 5C:
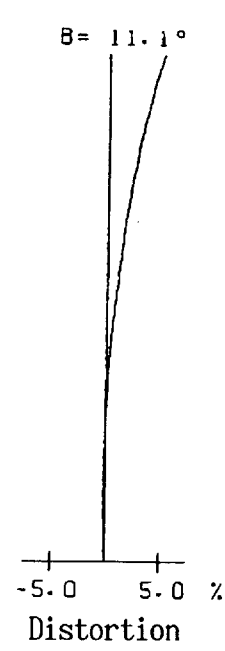

FIGS. 1 and 2 show an embodiment of a real image finder according to the present invention. The real image finder is a zoom finder applied to a compact zoom camera CZ. An optical axis O1 of an objective optical system 10 is spaced in parallel from an optical axis O2 of an ocular optical system 20 by a distance L3. Incident light along the optical axis O1 of the objective optical system 10 is bent downward by a first mirror 31 and is bent by a second mirror 32 to travel along an optical axis O3. The light is then reflected upward by a third reflection surface 34 of a prism 33 and is reflected by a fourth reflection surface 35 of the prism 33 to travel along the optical axis O2. The four reflection surfaces 31, 32, 34, and 35 constitute an image erecting system. Note that the term "downward direction" refers to the back side of the sheet of the drawing in FIG. 1 or the lower side in FIG. 2.

The objective optical system 10 comprises of stationary lenses 11, 12 and variable power lenses 13 and 14 in this order from an object side. The objective optical system 10 is located on the optical axis 01 to form a real image of an object to be viewed on a primary image forming surface (LCD) 16. A stationary lens (transparent member) 15, the primary image forming surface 16, and a plane-parallel plate (transparent member) 17 are arranged on the optical axis O3 and are sealed in a sealing tube 18. The ocular optical system 20 comprises stationary lenses 21 and 22. The stationary lens 15 is located at the objective optical system 10 side, and the plane-parallel plate 17 is located at the ocular optical system side 20.

According to the present embodiment, in the real image finder constructed as above, the distance between the primary image forming surface 16 and the mirror 32, and the distance between the primary image forming surface 16 and the incident surface 36 of the prism 33, are increased to meet the requirements specified in relationships (1) and (2). The distance $L_1$ between the primary image forming surface 16 and the mirror 32 refers to the distance between the primary image forming surface 16 and a lowest point of reflection of rays on the first reflection surface (mirror 32) of the objective optical system, as viewed from the primary image forming surface side towards the objective optical system side, along the optical axis direction. Namely, since the mirror 32 is inclined with respect to the optical axis, the distance between the first reflection surface 32 and the primary image forming surface 16 differs depending on the reflection points of effective light on the mirror 32, and hence, the distance between the primary image forming surface 16 and the mirror 32 at the reflection point closest to the primary image forming surface 16 on the optical axis is defined as the distance between the primary image forming surface 16 and the mirror 32. Similarly, the distance $L_2$ between the primary image forming surface 16 and the incident surface 36 of the prism 33 refers to that on the optical axis.

If the mirror 32 or the prism 33 is located close to the primary image forming surface 16 at a distance smaller than the lower limit specified in relationship (1) or (2), the foreign matter attached to the mirror 32 or the incident surface 36 of the prism 33 can be viewed through the ocular optical system 20, together with the object image formed on the primary image forming surface 16 by the objective optical system 10. Consequently, the foreign matter ruins the view.

Relationship (3) specifies the distance between the optical axis O1 of the objective optical system 10 and the optical axis O2 of the ocular optical system 20. It is preferable that the objective optical system of the viewfinder in a lens shutter type camera be located directly above a photographing optical system to reduce parallax. On the other hand, it is preferable that the ocular optical system be located toward a side of the camera body so as to prevent the camera body from interfering with a photographer's nose. To this end, the distance L3 between the optical axis O1 of the objective optical system 10 and the optical axis O2 of the ocular optical system 20 is preferably above 15 mm. If the ratio defined in relationship (3) is larger than the limit, when the focal length fe of the ocular optical system 20 is approximately 20 to 30 mm, the distance L3 is 16 to 24 mm. If the length L3 is long, the length of the light paths along the optical axes O1 and O2 of the objective optical system 10 and the ocular optical system 20 can be reduced. This is based on the assumption that the total length of the light paths along the optical axes O1, O2 and O3 (optical distance from the stationary lens 11 and the stationary lens 22) is constant. Hence, the camera can be made thin (small).

To miniaturize the camera, it is necessary to make the viewfinder small. To this end, two reflection surfaces of the image erecting system are provided in front of the primary image forming surface, and two reflection surfaces of the image erecting system are provided behind the primary image forming surface. Moreover, two reflections by the mirrors on the front side, i.e., on the objective optical system side, occur. Using mirrors to provide the two reflections is more advantageous for miniaturization of the objective optical system, as compared to a prism providing two reflections. In addition to the foregoing, the prism providing two reflections on the rear side, i.e., on the ocular optical system side, is more advantageous to increase of the finder magnification as compared to mirrors providing two reflections. In particular, the arrangement in which the two reflection mirror surfaces are positioned before the primary image forming surface and the two reflection prism surfaces are positioned behind the primary image forming surface, where the optical arrangement satisfies the requirement specified in relationship (3), makes the viewfinder small and thin and increases the finder magnification to enhance viewing capability.

Embodiments of the present invention will be discussed below.

<Embodiment 1>
$L_1 = -4.380$ mm $L_2 = 4.981$ mm $f_e = 20.642$ mm $L_3 = 18.661$ mm $|L_1/(f_e^2/1000)| = 10.28 > 10$ $|L_2/(f_e^2/1000)| = 11.69 > 11$ $L_3/f_e = 0.904 > 0.8$ <Embodiment 2>

$L_1 = -5.816$ mm $L_2 = 5.600$ mm $f_e = 20.647$ mm $L_3 = 20.716$ mm $|L_1/(f_e^2/1000)| = 13.64 > 10$ $|L_2/(f_e^2/1000)| = 13.14 > 11$ $L_3/f_e = 1.003 > 0.8$

According to the above embodiments, it can be understood that neither foreign matter attached to the mirror 31 of the image erection system or the reflection surface 35 of the prism 33, nor foreign matter attached to the mirror 32 or the reflection surface 36 of the prism 33, can be viewed through the ocular optical system 20.

A numerical example of a real image finder according to the present invention will be described below.

FIG. 3 shows a lens arrangement at a wide-angle extremity (low magnification) and FIGS. 4A–4C and 5A–5C show aberration diagrams of the lens arrangement shown in FIG. 3 at the wide-angle extremity (low magnification) and at a telephoto extremity (high magnification), respectively. Table 1 below shows numerical data of the lens arrangement. In the Table and drawings, "ER" represents the pupil diameter, "B" the half emission angle, "S" the Sagittal rays, "M" the Meridional rays, "R" the radius of curvature, "D" the lens thickness or distance between lenses, "Nd" the refractive index of the d-line, and "vd" the Abbe number.

TABLE 1

| Surface No. | R | D | Nd | vd |
|---|---|---|---|---|
| 1 | ∞ | 1.50 | 1.49176 | 57.4 |
| 2 | ∞ | 1.40 | — | — |
| 3 | 17.823 | 2.35 | 1.49176 | 57.4 |
| 4 | −22.743 | 1.92–6.35 | — | — |
| 5 | −6.927 | 1.20 | 1.49176 | 57.4 |
| 6 | 7.679 | 14.73–5.50 | — | — |
| 7 | 13.660 | 1.80 | 1.49176 | 57.4 |
| 8 | −9.951 | 17.70–22.50 | — | — |
| 9 | 8.565 | 1.48 | 1.49176 | 57.4 |
| 10 | 19.906 | 1.20 | — | — |
| 11 | ∞ | 0.80 | 1.51633 | 64.1 |
| 12 | ∞ | 2.08 | — | — |
| 13 | ∞ | 1.00 | 1.49176 | 57.4 |
| 14 | ∞ | 1.50 | — | — |
| 15 | ∞ | 17.30 | 1.52580 | 52.1 |
| 16 | ∞ | 3.40 | — | — |
| 17* | 24.150 | 2.40 | 1.49176 | 57.4 |
| 18 | −16.938 | 1.60 | — | — |
| 19 | ∞ | 1.50 | 1.49176 | 57.4 |
| 20 | ∞ | — | — | — |

*designates rotation symmetrical aspherical surface having a rotational axis.

Aspherical Data:
No.3 $K=0.0\ A4=-0.46567\times10^{-4}, A6=-0.12391\times10^{-5}$
No.5 $K=0.4649,\ A4=0.14538\times10^{-2}, A6=0.20589\times10^{-5}$
No.7 $K=0.0,\ A4=-0.38047\times10^{-3},\ A6=0.46696\ 1\times10^{-5}$
No.17 $K=0.0,\ A4=-0.10752\times10^{-3}, A6=0.3987\ 2\times10^{-6}$ The rotation symmetrical aspherical surface can be generally expressed as follows:

$$x = Ch^2/\{1+[1-(1+K)C^2h^2]^{1/2}\} + A4h^4 + A6h^6 + A8h^8 + \ldots$$

wherein, h represents a height above the axis,
  x represents a distance from a tangent plane of an aspherical vertex,
  C represents a curvature of the aspherical vertex (1/r),
  K represents a conic constant,
  A4 represents a fourth-order aspherical factor,
  A6 represents a sixth-order aspherical factor, and
  A8 represents an eighth-order aspherical factor.

As can be understood from the foregoing, in a real image finder according to the present invention, foreign matter attached to the reflection surfaces of the optical image erection system is inconspicuous when observing an object.

What is claimed is:

1. A real image finder, comprising:
  an objective optical system which forms an image of an object on a primary image forming surface;
  an ocular optical system which is adapted to view said object image formed on said primary image forming surface;
  an image erection optical system having four reflection surfaces;
  an optical axis of said objective optical system being in parallel with an optical axis of said ocular optical system;
  two of said four reflection surfaces of said image erection optical system being located before said primary image forming surface on an ocular optical system side of said real image finder, and two reflection surfaces of said image erection optical system being located after said primary image forming surface on an objective image side of said real image finder; and
  said two reflection surfaces located on the objective optical system side being defined by mirrors and said two reflection surfaces located on the ocular optical system side being defined by a prism,
  wherein said finder satisfies the following relationships:

$|L_1 \div (f_e^2/1000)| > 10$
  $|L_2 \div (f_e^2/1000)| > 11$
  $L_3 \div f_e > 0.8$ wherein
  $L_1$ represents the distance, along an optical axis direction, between the primary image forming surface and a lowest reflection point of rays on a first surface of the image erection optical system as viewed from the primary image forming surface side towards the objective optical image side;
  $L_2$ represents the distance along an optical axis direction between the primary image forming surface and a point on an incident surface of the image erection optical system as viewed from the primary image forming surface side towards the ocular optical system side;
  $f_e$ represents the focal length of the ocular optical system; and
  $L_3$ represents the distance between the optical axis of the objective optical system and the optical axis of the ocular optical system.

2. A real image finder according to claim 1, wherein said primary image forming surface is positioned in a sealing tube, and both ends of said sealing tube are sealed by a pair of transparent members.

3. A real image finder according to claim 2, wherein one of said pair of transparent members is a stationary lens and the other is a plane-parallel plate.

4. A real image finder according to claim 3, wherein said stationary lens is located at said objective optical system side and said plane-parallel plate is located at said ocular optical system side.

* * * * *